Nov. 20, 1962 A. J. MISSLICH ETAL 3,065,027
RETRACTABLE SEAT BELT
Filed Dec. 30, 1960 2 Sheets-Sheet 1
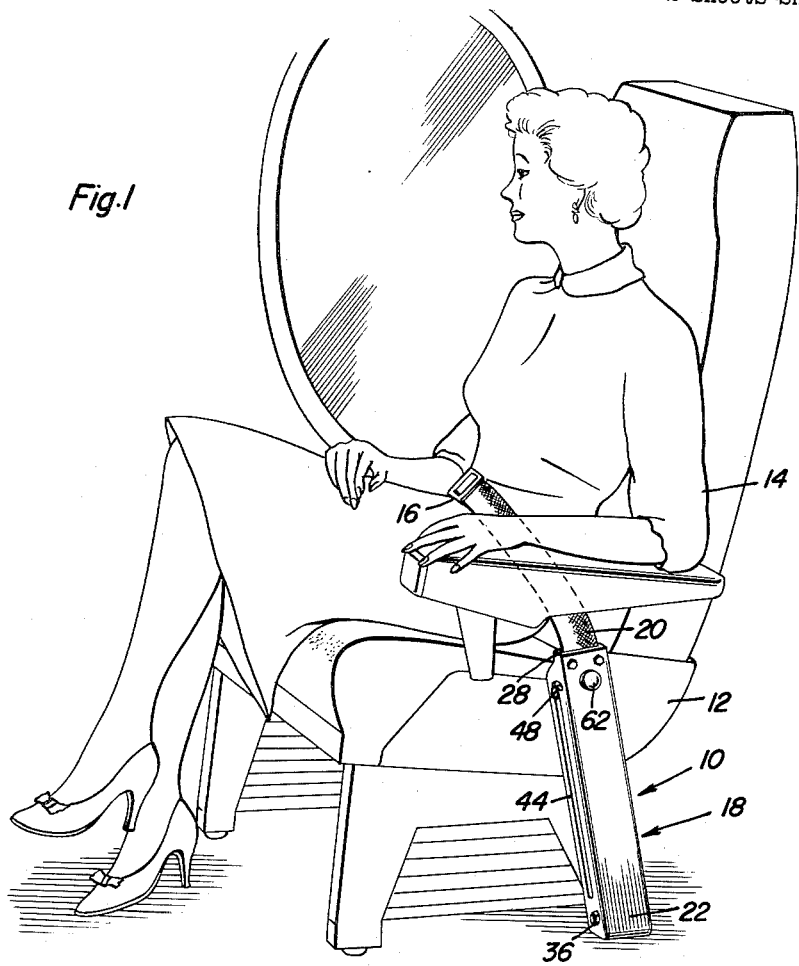
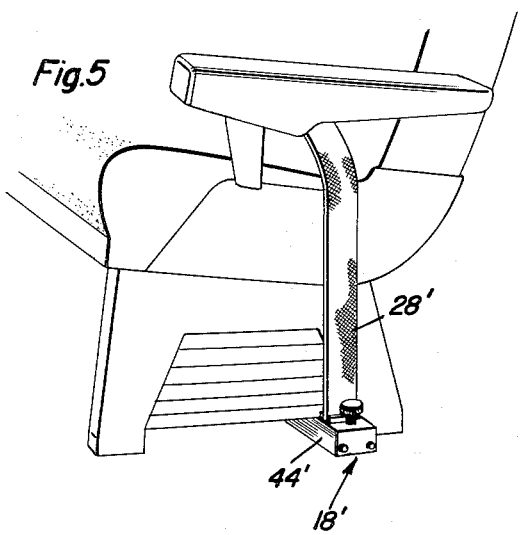
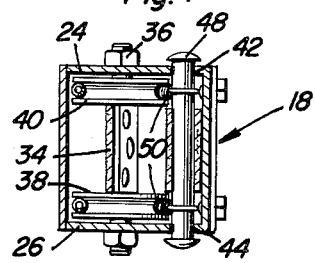
Albert J. Misslich
Floyd C. Austin
INVENTORS

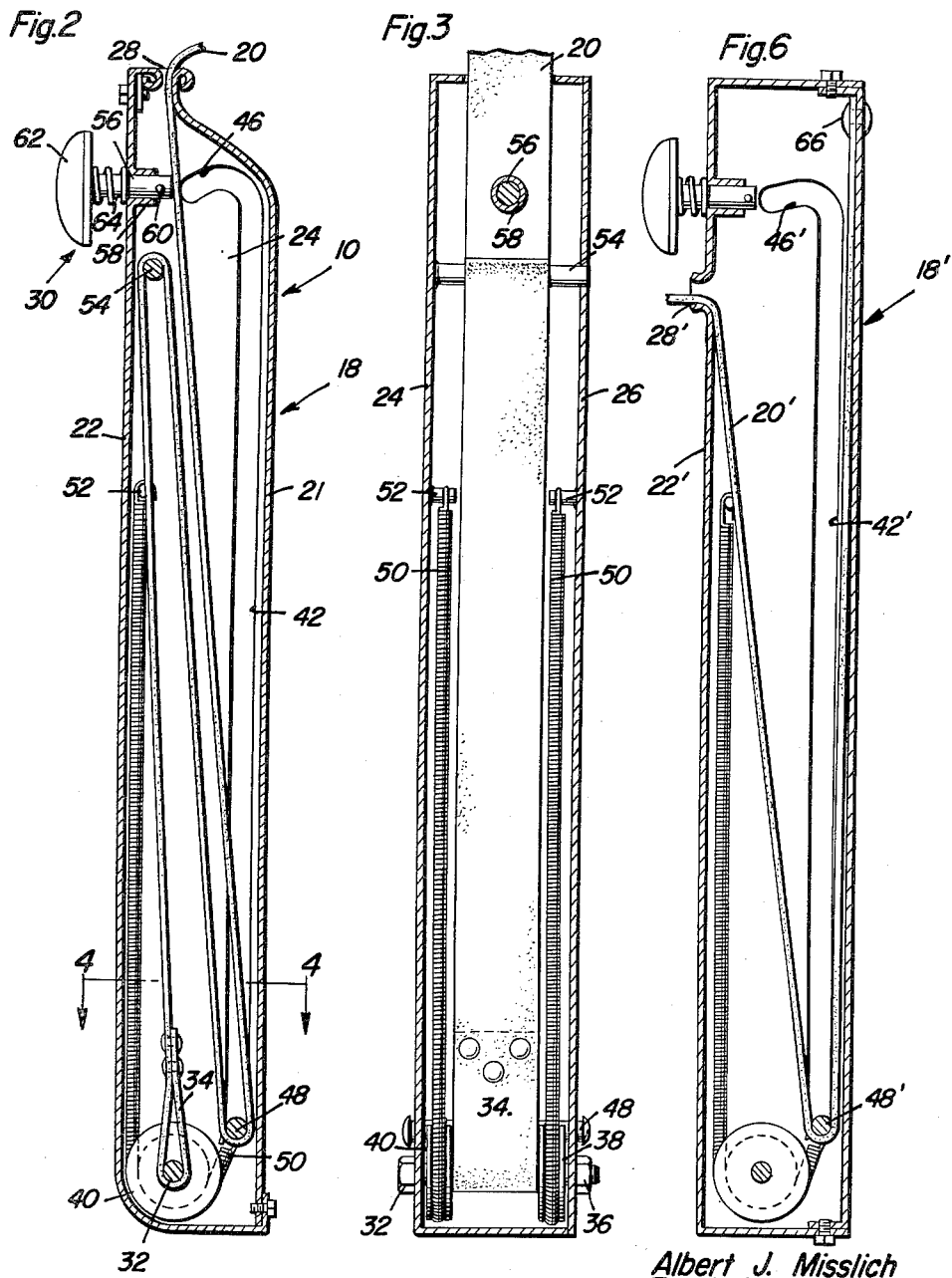

United States Patent Office 3,065,027
Patented Nov. 20, 1962

3,065,027
RETRACTABLE SEAT BELT
Albert J. Misslich, Hill Point, and Floyd C. Austin,
Richland Center, Wis.
Filed Dec. 30, 1960, Ser. No. 79,883
6 Claims. (Cl. 297—388)

This invention relates to a novel and useful retractable seat belt construction specifically adapted for use with all types of seats with which seat belts may be used in conjunction therewith.

The retractable seat belt of the instant invention includes the provision of a housing in which one end of a seat belt is secured. The housing is provided with means for engagement with the portion of the seat belt disposed therein for resiliently urging that portion of the seat belt projecting out of the housing toward a retracted position within the housing. The advantages of the retractable type of seat belts are numerous and many various types of retractable seat belts have heretofore been utilized to great advantage.

The previous types of retractable seat belts have been provided with various means for resiliently urging the extended portion of the seat belt toward a retracted position within the housing. Although persons familiar with the operation of seat belts and well acquainted with the manner in which the seat belt buckle is operated are readily able to secure the seat belt in an operative position although the two sections of the seat belt are being resiliently urged to a retracted position, those persons occasionally utilizing commercial airlines as a means of travel are not fully familiarized with the operation of seat belt mechanisms and therefore would have great difficulty in securing the two sections of the seat belt together if the two sections were each constantly resiliently urged to a retracted position.

Accordingly, the main object of this invention is to provide a retractable seat belt construction provided with means for resiliently urging the seat belt sections to retracted positions within suitable housings but also provided with latch means for releasably engaging the means by which the seat belt is resiliently urged to a retracted position when the seat belt is withdrawn to an extended position whereby the resilient means will be rendered inoperative to urge the sections of the seat belt toward retracted positions thereby enabling even the most inexperienced passenger to have ample time to secure the free ends of the seat belt sections together so that he may be properly secured in his seat.

A further object of this invention, in accordance with the immediately preceding object, is to provide a retractable seat belt having a housing for substantially entirely enclosing the seat belt when it is not being used which may readily be secured to an airplane seat or the like in an unobtrusive manner and in various positions relative to the seat.

Still another object of this invention is to provide a release mechanism for the retractable seat belt construction which may readily be manipulated by a passenger in order to render the resilient means effective for returning the extended portion of the seat belt to a retracted position within the seat belt housing.

A final object of this invention to be specifically enumerated herein is to provide a retractable seat belt construction which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an airplane seat with the retractable seat belt construction of the instant invention secured thereto and being utilized to strap a passenger in the seat;

FIGURE 2 is a vertical sectional view of the seat belt construction taken substantially upon a plane passing through the longitudinal centerline of the housing of the seat belt;

FIGURE 3 is a longitudinal sectional view taken substantially upon a plane passing through the longitudinal centerline of the seat belt housing and at right angles to the plane along which FIGURE 2 is taken;

FIGURE 4 is a horizontal sectional view taken substantially upon the plane indicated by the section line 4—4 of FIGURE 2;

FIGURE 5 is a perspective view of a modified form of retractable seat belt secured to an airplane seat; and FIGURE 6 is a vertical longitudinal sectional view similar to that of FIGURE 2 but showing the details of construction of the modified form of the seat belt illustrated in FIGURE 5.

Referring now more specifically to the drawings, the numeral 10 generally designates one-half of the retractable seat belt construction of the instant invention which is shown secured to the side of a conventional type of airplane seat 12 in which a passenger 14 is seated.

It is of course to be realized that seat belts come in two sections and are provided with buckle assemblies such as that indicated by the reference numeral 16 in FIGURE 1 for securing the free ends of the seat belt sections together. Inasmuch as it is to be understood that each of the seat belt sections is to be provided with its individual housing for receiving the latter in a retracted position when the seat belt is not being used, only the half of the seat belt generally designated by the reference numeral 10 will be described, it being understood that the other half is substantially the same as the half generally designated by the reference numeral 10.

The seat belt generally designated by the reference numeral 10 includes a housing referred to in general by the reference numeral 18 and a seat belt section 20. With attention now directed to FIGURES 2 and 3 of the drawings it will be noted that the housing 18 includes opposite side walls 21 and 22 and opposite end walls 24 and 26 which are secured together in any convenient manner. The housing 18 includes an opening 28 formed in one end thereof and an actuator mechanism referred to in general by the reference numeral 30. The seat belt section 20 passes through the opening 28 and is secured to a shaft 32 secured between the end walls 24 and 26 by means of a loop portion 34. The shaft 32 is secured through the end walls 24 and 26 by means of a threaded fastener 36 secured to one end and has a pair of pulleys 38 and 40 rotatably journaled thereon. The end walls 24 and 26 are each provided with guide means in the form of longitudinally extending slots 42 and 44. Each of the slots 42 and 44 includes a substantially straight portion extending longitudinally of the end walls 24 and 26 which terminates adjacent the end of the housing 18 having the opening 28 formed therein in an angulated portion 46 forming an occluded angle of less than 90 degrees with the end portion of the angulated portion 46 disposed closer to the remote end of the housing 18 than the end of the angulated portion 46 adjacent the straight portions of the slots 42 and 44.

A deflecting shaft 48 has its opposite ends slidably received in the slots 42 and 44 and is resiliently urged toward a position in the end of the slots 42 and 44 remote from the angulated portions 46 thereof by means of a pair of coil springs 50 each having one end secured to an end of the shaft 48 and the other end passed about the corresponding pulley and secured to one of the pins 52 carried by the inner surfaces of the end walls 24 and 26 adjacent the actuating mechanism 30. Also carried by and secured between the end walls 24 and 26 adjacent the actuator 30 is a deflecting member shaft 54. The end of the belt section 20 disposed within the housing 18 is first passed about the deflecting shaft 48 and then about the deflecting member shaft 54 before being secured to the shaft 32.

Thus, it will be noted that when the belt section 20 is withdrawn from the housing 18 the deflecting shaft 48 will ride upwardly through the slots 42 and 44 toward their upper ends against the tension of the coil springs 50. Because of the positioning of the angulated end portions 46 with respect to the opening 28 and the pulleys 38 and 40, as the belt section 20 is withdrawn from the housing 18 a sufficient amount to effect movement of the deflecting shaft 48 to the uppermost portion of the slots 42 and 44, the tension of the coil springs 50 will urge the deflecting shaft 48 into the angulated portions 46 of the slots 42 and 44. After the deflecting shaft 48 has been positioned in the angulated portions 46, the belt section 20 may be released whereupon the opposite ends of the deflecting shaft 48 will be held captive in the ends of the angulated portions 46.

The actuator assembly generally referred to by the reference numeral 30 includes an actuator shaft 56 slidably disposed in the journal 58 carried by the side wall 22. The inner end of the shaft 56 is provided with a transverse pin 60 for preventing withdrawal of the shaft 56 and the outer end thereof is provided with a diametrically enlarged head or button 62 between which and the outer surfaces of the side wall 22 adjacent the shaft 56 is disposed a compression spring 64 for normally urging the actuator shaft 56 toward a position away from the angulated portions 46 of the slots 42 and 44. It is to be noted that the actuator shaft 56 comprises a means for disengaging the deflecting shaft 48 from engagement with the latch means formed by the angulated portions 46. Upon inward movement of the diametrically enlarged head portion or button 62 the remote end of the shaft 56 will engage the center of the deflecting shaft 48 and urge the shaft 48 out of its position seated in the angulated portions 46 of the slots 42 and 44 whereupon the coil springs 50 will again be effective to resiliently urge the free end of the strap section 20 toward a retracted position within the housing 18.

Referring now to FIGURES 5 and 6 of the drawings there will be seen a modified form of housing generally referred to by the reference numeral 18' which is substantially identical with the housing 18 in all respects with the exception that the opening 28' thereof is formed in the side wall 22'. Additionally, there is no deflecting member shaft similar to shaft 54 provided and it will be noted that the innermost end of the belt section 20' is secured within the housing 18' adjacent the upper end thereof as at 66.

It will be noted that the position of the opening 28' relative to the angulated end portions 46' of the slots 42' and 44' are still such that the retraction of the seat belt section from within the housing 18' will result in the deflecting shaft 48' being seated within the angulated portions 46' of the slots 42' and 44'.

Thus, the operation of the seat belt disposed within the housing 18' is substantially the same as the seat belt section disposed in the housing 18 with the only differences of the housing 18' being that the opening 28' is formed at a different location and there are formed only two reaches of the belt section 20' therein instead of the three reaches of the belt section 20 as is disposed within the housing 18 when the seat belt 20 is in a retracted position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equiva'ents may be resorted to, falling within the scope of the invention as claimed.

What is claimed as new is as follows:

1. A retractable seat belt comprising a housing adapted to be secured to a passenger seat at one side thereof, said housing having an outlet opening formed therein, a seat belt having one end fixed in said housing and the other end projecting outward'y through said opening, deflecting means in said housing yieldably and laterally deflecting a midportion of said belt disposed between said fixed end and said opening and urging the free end of said belt toward a retracted position within said housing, releasab'e latch means engageable by said deflecting means for rendering the latter ineffective for resiliently laterally deflecting said midportion of said belt and urging the free end thereof toward a retracted position from an extended position, said latch means including means for automatically engaging said deflecting means in direct response to full withdrawal of the free end portion of said belt from said housing toward the extended position.

2. The combination of claim 1 wherein said deflecting means comprises a shaft about which said midportion of said belt passes and is laterally deflected, means movably mounting said shaft in said housing for movement toward and away from said opening, means resiliently urging said shaft away from said opening.

3. The combination of claim 2 wherein said housing is elongated and said opening is formed adjacent one end of said housing, said one end of said belt being secured to said housing adjacent said opening, said shaft being mounted for movement longitudinally of said housing and resiliently urged toward the end of said housing remote from said opening.

4. The combination of claim 3 wherein said mounting means includes longitudinally extending guide means in said housing slidably receiving the opposite ends of said shaft and terminating adjacent said opening in an angulated portion extending toward said opening, forming an included angle of less than 90 degrees with the adjacent portion of the remainder of said guide means and comprising a portion of said latch means.

5. The combination of claim 4 including a manually actuated actuator engageable with said shaft for urging said shaft from a seated position in the free end of said angulated portion of said guide means to the other end of said angulated portion.

6. The combination of claim 5 wherein said actuator includes means normally urging said actuator in a direction away from engagement with said shaft when the latter is disposed in said free end of said angulated portion of said guide means.

References Cited in the file of this patent

UNITED STATES PATENTS

| 2,468,560 | Kirkpatrick | Apr. 26, 1949 |
| 2,488,858 | Franz | Nov. 22, 1949 |
| 2,649,145 | McCarthy | Aug. 18, 1953 |
| 2,725,097 | Thoreson | Nov. 29, 1955 |
| 2,798,539 | Johnson | July 9, 1957 |
| 2,830,655 | Lalanda | Apr. 15, 1958 |

FOREIGN PATENTS

| 820,770 | Great Britain | Sept. 23, 1959 |